(12) United States Patent
Booth et al.

(10) Patent No.: US 7,302,909 B2
(45) Date of Patent: Dec. 4, 2007

(54) NOZZLE ASSEMBLY FOR IMPRINTING PATTERNS ON AN EXTRUDED PRODUCT

(75) Inventors: John Booth, Cheshire (GB); James M. Whitham, Cheshire (GB)

(73) Assignee: Kellogg Company, Battle Creek, MI (US)

( * ) Notice: Subject to any disclaimer, the term of this patent is extended or adjusted under 35 U.S.C. 154(b) by 95 days.

(21) Appl. No.: 11/035,571

(22) Filed: Jan. 14, 2005

(65) Prior Publication Data

US 2005/0155545 A1 Jul. 21, 2005

Related U.S. Application Data

(60) Provisional application No. 60/536,620, filed on Jan. 15, 2004.

(51) Int. Cl.
*B05C 5/02* (2006.01)

(52) U.S. Cl. .......................... 118/13; 118/24; 118/314; 118/316

(58) Field of Classification Search .................. 118/13, 118/24, 314, 316, DIG. 11; 239/434, 434.5
See application file for complete search history.

(56) References Cited

U.S. PATENT DOCUMENTS

| | | | |
|---|---|---|---|
| 2,246,871 A | 6/1941 | Balch | |
| 2,316,165 A | 4/1943 | Howser | |
| 2,392,698 A | 1/1946 | Russell | |
| 2,858,217 A | 10/1958 | Benson | |
| 4,290,383 A | 9/1981 | Pfender | |
| 4,309,450 A | 1/1982 | Seibert | |
| 4,368,684 A | 1/1983 | Launay | |
| 4,369,200 A | 1/1983 | Iwao et al. | |
| 4,578,273 A | 3/1986 | Krubert | |
| 4,579,741 A | 4/1986 | Hanson et al. | |
| 4,751,878 A * | 6/1988 | Lopes | 99/450.1 |
| 4,859,165 A | 8/1989 | Hoashi | |
| 4,985,260 A | 1/1991 | Niaura et al. | |
| 5,049,399 A | 9/1991 | Huang et al. | |
| 6,007,627 A | 12/1999 | Barnholtz | |
| 6,200,510 B1 | 3/2001 | DuCharme, Jr. et al. | |
| 6,251,456 B1 | 6/2001 | Maul et al. | |
| 6,267,073 B1 | 7/2001 | Busse et al. | |
| 6,340,488 B1 | 1/2002 | French et al. | |
| 6,390,662 B1 * | 5/2002 | Henry et al. | 366/177.1 |
| 2001/0041200 A1 | 11/2001 | Grollet | |
| 2001/0046535 A1 | 11/2001 | Bowling | |

(Continued)

FOREIGN PATENT DOCUMENTS

DE 8800314 10/1988

(Continued)

*Primary Examiner*—Laura Edwards
(74) *Attorney, Agent, or Firm*—Dickinson Wright PLLC (57) ABSTRACT

The invention provides a nozzle assembly for spraying a food product. The nozzle assembly includes a first sprayer disposed along an axis defining, at least in part, a path of movement for a food product. The nozzle assembly also includes a second sprayer disposed along the axis. The second sprayer is axially and radially spaced from the first sprayer. The nozzle assembly also includes a cavity operable to receive edible ink. The cavity communicates directly with the first and second sprayers disposed along the axis. The first and second sprayers concurrently spray the edible ink from the cavity to the axis.

7 Claims, 7 Drawing Sheets

U.S. PATENT DOCUMENTS

| | | |
|---|---|---|
| 2002/0081398 A1 | 6/2002 | Bennett et al. |
| 2002/0098267 A1 | 7/2002 | Heisey et al. |
| 2002/0114863 A1 | 8/2002 | Ream et al. |
| 2002/0135651 A1 | 9/2002 | Spurgeon et al |

FOREIGN PATENT DOCUMENTS

| | | |
|---|---|---|
| DE | 38 10 298 A1 | 10/1989 |
| DE | 196 26 316 A1 | 1/1998 |
| EP | 0048184 B1 | 9/1985 |
| EP | 0221757 A2 | 5/1987 |
| EP | 0340775 A1 | 11/1989 |
| EP | 0340776 A1 | 11/1989 |
| EP | 0 571 043 A2 | 5/1993 |
| EP | 0373286 B1 | 12/1993 |
| EP | 0601194 B1 | 6/1994 |
| EP | 0818154 A1 | 1/1998 |
| EP | 0848910 B1 | 6/1998 |
| EP | 0993778 A1 | 4/2000 |
| EP | 1058502 B1 | 12/2000 |
| EP | 1047836 B1 | 2/2003 |
| FR | 8100843 | 7/1982 |
| GB | 1 604 586 | 12/1981 |
| GB | 2317551 A | 4/1998 |
| NL | 6709932 | 1/1969 |
| WO | WO 97/16075 | 5/1997 |
| WO | WO/97/27759 | 8/1997 |
| WO | WO/99/48696 | 9/1999 |
| WO | WO/00/13524 | 3/2000 |
| WO | WO 02/34054 A2 | 5/2002 |

\* cited by examiner

NOZZLE ASSEMBLY FOR IMPRINTING PATTERNS ON AN EXTRUDED PRODUCT

CROSS REFERENCE TO RELATED APPLICATIONS

This application claims the benefit of U.S. Provisional Patent Application Ser. No. 60/536,620 for a NOZZLE ASSEMBLY FOR IMPRINTING PATTERNS ON AN EXTRUDED PRODUCT, filed on Jan. 15, 2004, which is hereby incorporated by reference in its entirety.

TECHNICAL FIELD

The invention relates to a nozzle assembly for imprinting patterns on food products with edible ink.

BACKGROUND OF THE INVENTION

Food products can be sprayed with edible ink to enhance the appearance or taste of the food product. For example, the sprayed material can be a different color than the food product so that the resulting food product has a visually stimulating appearance. For example, stripes can be sprayed on a food product. In another example, the sprayed material can taste differently than the food product so that the resulting food product has a combination of flavors.

SUMMARY OF THE INVENTION

The invention provides a nozzle assembly for spraying a food product. The nozzle assembly includes a first sprayer disposed along an axis defining, at least in part, a path of movement for a food product. The nozzle assembly also includes a second sprayer disposed along the axis. The second sprayer is axially and radially spaced from the first sprayer. The nozzle assembly also includes a cavity operable to receive edible ink. The cavity communicates directly with the first and second sprayers disposed along the axis. The first and second sprayers concurrently spray the edible ink from the cavity to the axis.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
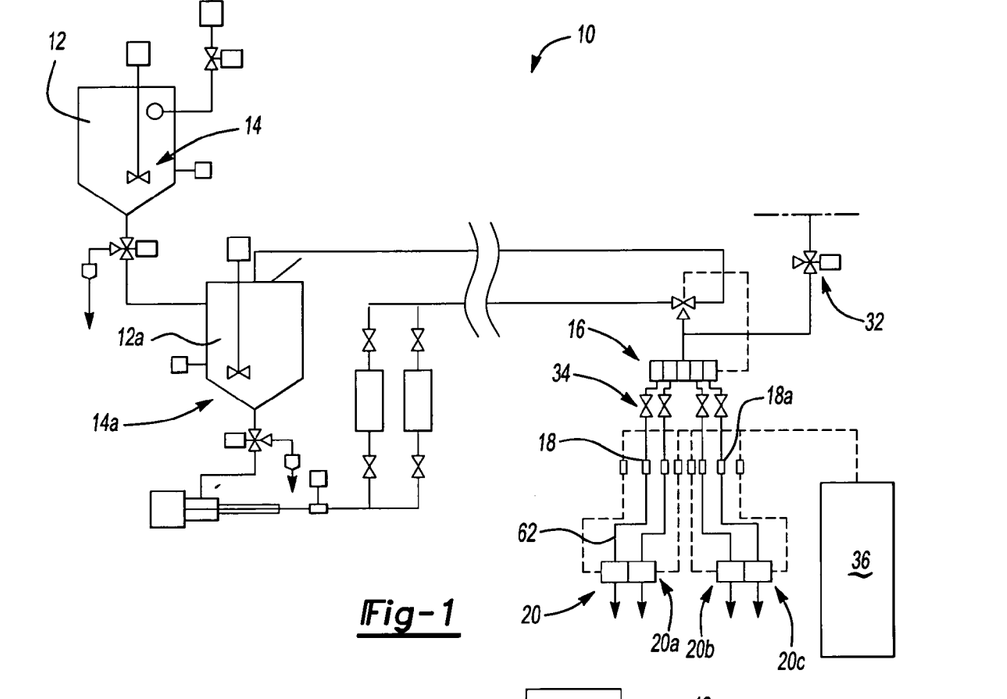
FIG. 1 is a schematic view of an exemplary ink supply system for supplying ink to the exemplary embodiment of the invention.

Referring now to FIG. 1, wherein like numerals indicate like or corresponding parts throughout the several views, an ink supply system is schematically shown at 10 in FIG. 1. The ink supply system 10 can include one or more tanks 12, 12a each having one or more agitators 14, 14a that feed edible ink, such as yogurt, chocolate, caramel, frosting and the like, to a manifold 16. The edible ink could also contain vitamins, colors, flavorings, and the like. The edible ink then moves through a series of quick release couplings, such as couplings 18, 18a into one or more nozzle assemblies 20, 20a, 20b, 20c. In the exemplary embodiment of the invention, the nozzle assemblies 20, 20a, 20b, 20c are constructed similarly with respect to one another. Therefore, operation and construction of the nozzle assembly 20 describe below is applicable to the nozzle assemblies 20a, 20b, 20c.

Figure 11:
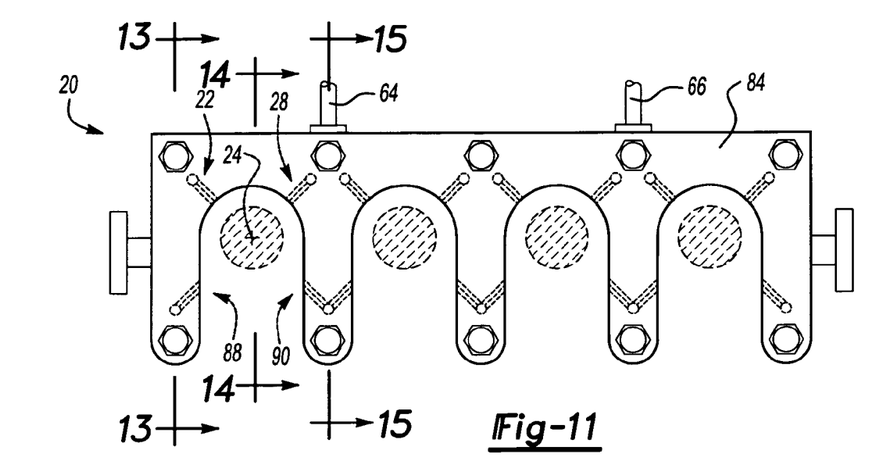
FIG. 11 is a front view of the assembled nozzle assembly of the exemplary embodiment of the invention.
Figures 12, 13:
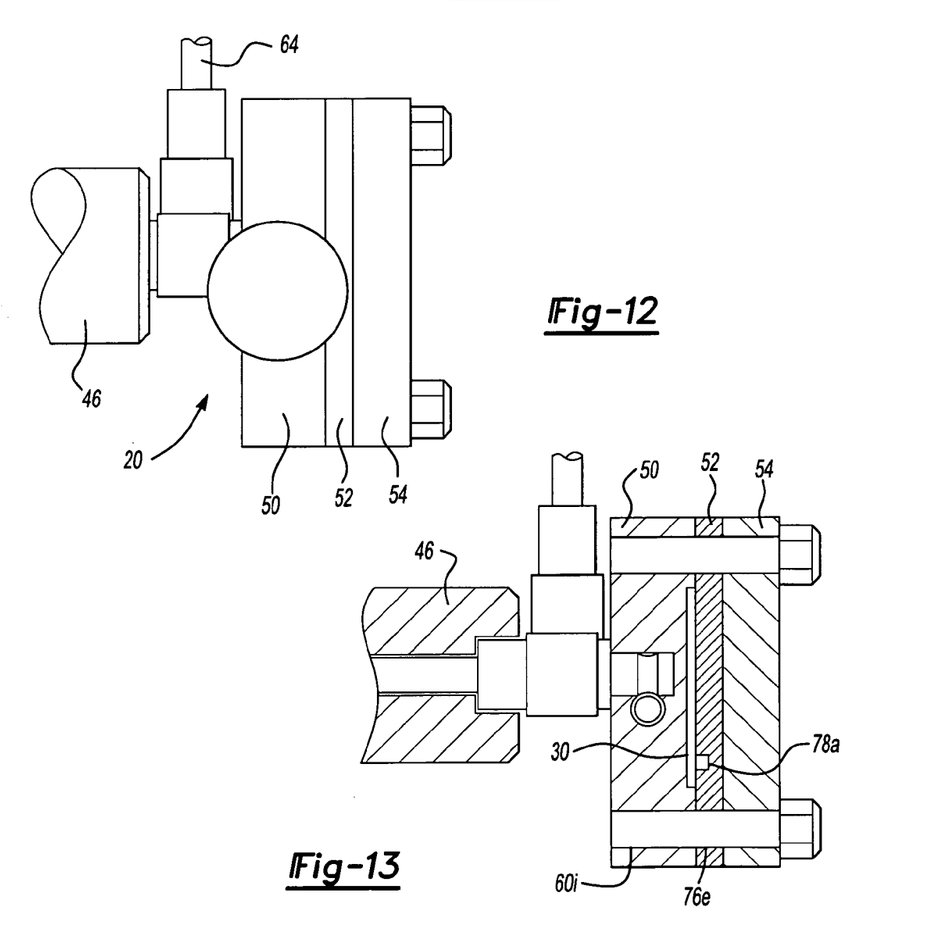
FIG. 12 is a partial left hand view of the nozzle assembly shown in FIG. 11.
FIG. 13 is a cross-sectional view taken along section lines 13-13 in FIG. 11.
Figure 14:
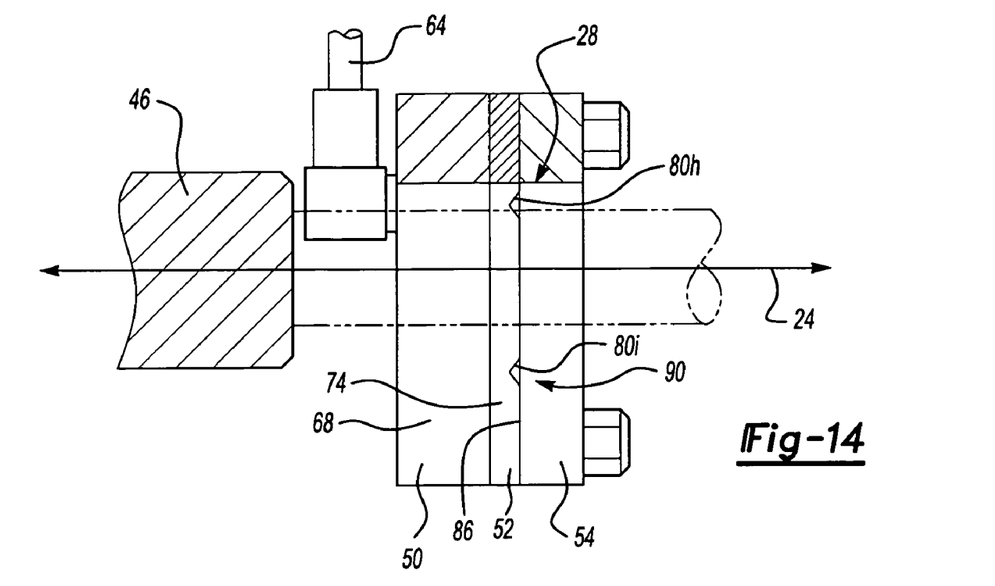
FIG. 14 is a cross-sectional view taken along section lines 14-14 in FIG. 11.
Figure 15:
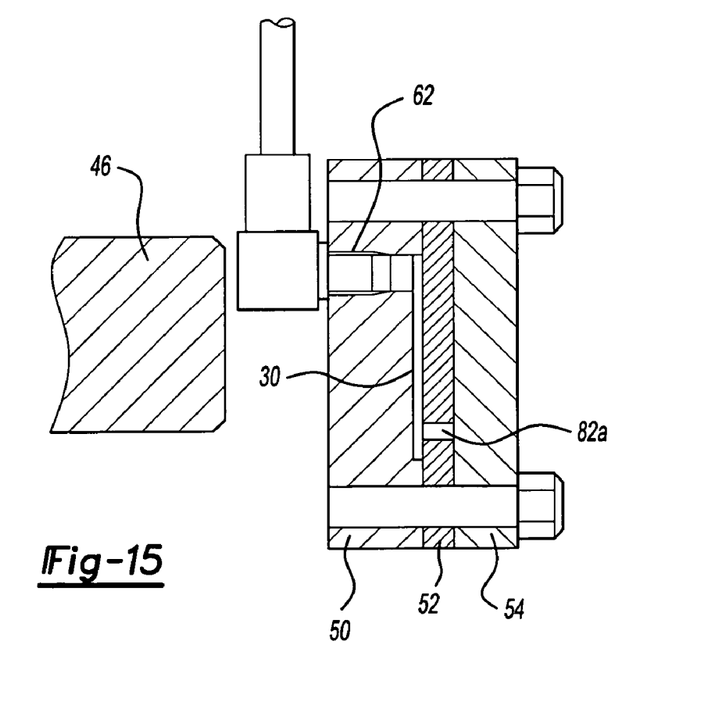
FIG. 15 is a cross-sectional view taken along section lines 14-14 in FIG. 11.

Referring now to FIG. 11, the nozzle assembly 20 includes a first sprayer 22 disposed along an axis 24 defining, at least in part, a path of movement for a food product 26. The nozzle assembly 20 also includes a second sprayer 28 disposed along the axis 24. The second sprayer 28 is axially and radially spaced from the first sprayer 22.

Figure 5:
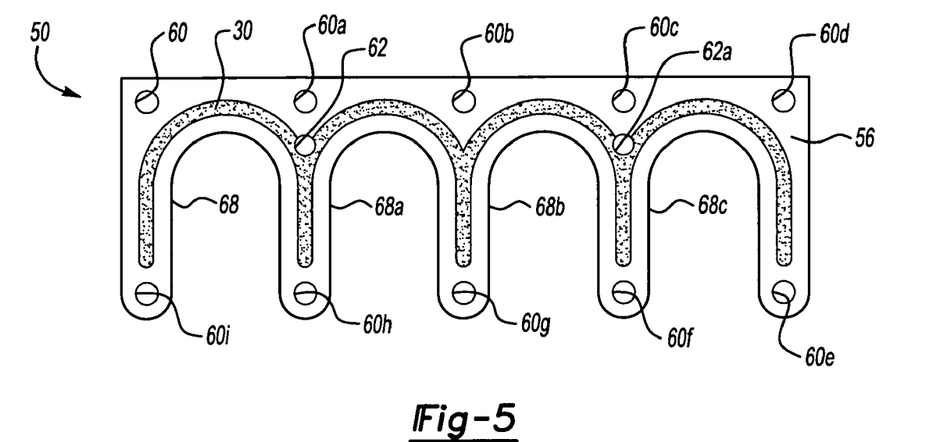
FIG. 5 is a front view of a first plate, or distribution plate, according to the exemplary embodiment of the invention.
Figure 6:
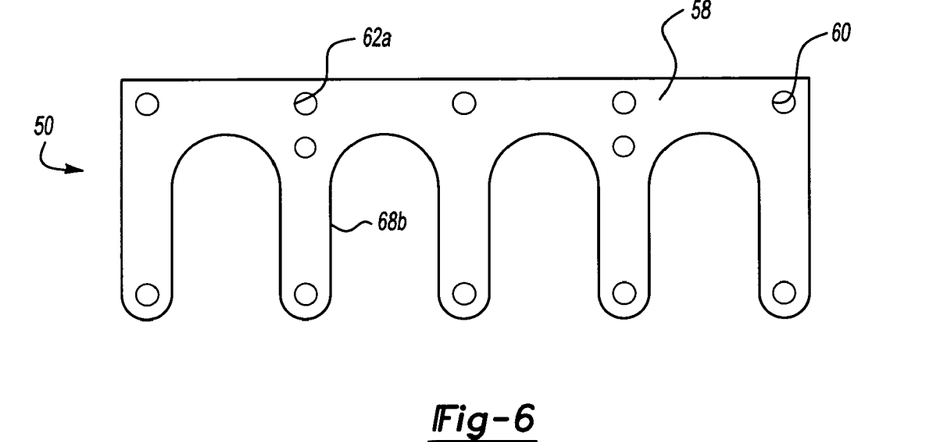
FIG. 6 is a rear view of the distribution plate shown in FIG. 5.

Referring now to FIG. 5, the nozzle assembly 20 also includes a cavity 30 operable to receive edible ink. The cavity communicates directly with the first and second sprayers 22, 28 disposed along the axis 24. The first and second sprayers 22, 28 concurrently spray the edible ink from the cavity 30 to the axis 24.

Referring again to FIG. 1, there are four nozzle assemblies 20, 20a, 20b, 20c in the exemplary embodiment of the invention. It should be appreciated that there may be any number of nozzle assemblies formed into a single series of nozzle assemblies or formed and mounted independently of each other.

A hot water supply 32 can be fed into the manifold 16 such that the equipment in the ink supply system 10 can be flushed of the edible ink. It should be appreciated that the ink supply system 10 can include any appropriate number of pressure control valves, pressure switches, drains, probes, meters, pumps and any other component of a fluid delivery system. It should also be appreciated that the ink supply system 10 can be of any suitable design for providing the edible ink to the nozzle assembly 20.

A solenoid valve 34 is disposed up stream of the nozzle assembly 20. Solenoid valves can also be disposed upstream of each of the nozzle assemblies 20a, 20b, 20c. The solenoid valve 34 is operable in an open configuration to allow passage of edible ink between the ink supply system 10 and the cavity 30 of the nozzle assembly 20. The solenoid valve 34 is also operable in a closed configuration to prevent passage of edible ink between the ink supply system 10 and the cavity 30 of the nozzle assembly. When the solenoid valve 34 is in the open configuration, edible ink is sprayed from the first and second sprayers 22, 28. When the solenoid valve 34 is in the closed configuration, edible ink is not sprayed from the first and second sprayers 22, 28. The solenoid valve 34 is controlled to change between the open and closed configurations by a controller 36.

Figure 2:
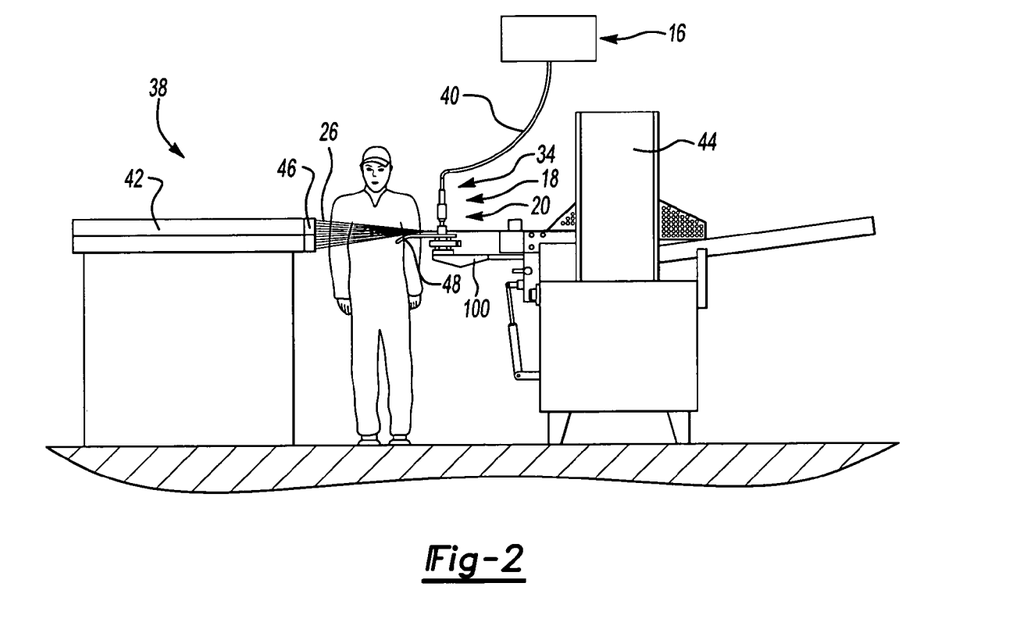
FIG. 2 is a front view of a food processing unit having incorporating the exemplary embodiment of the invention.
Figure 3:
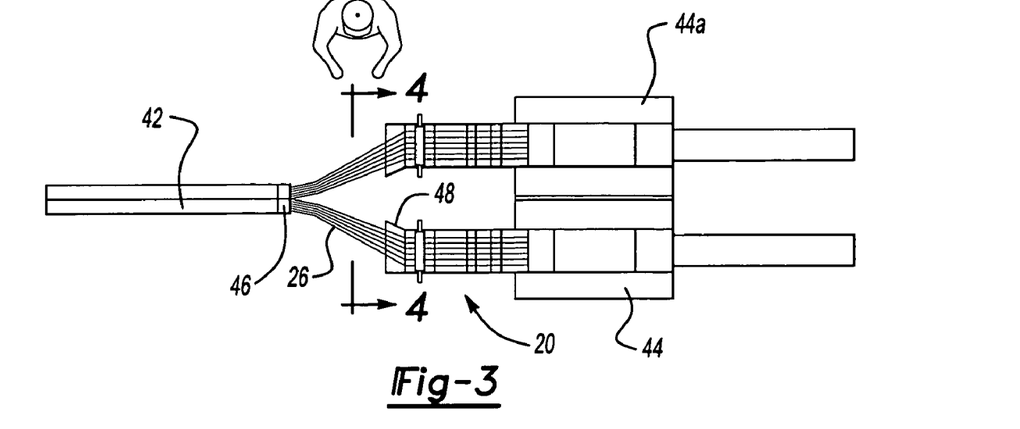
FIG. 3 is a top view of the food processing unit.
Figure 4:
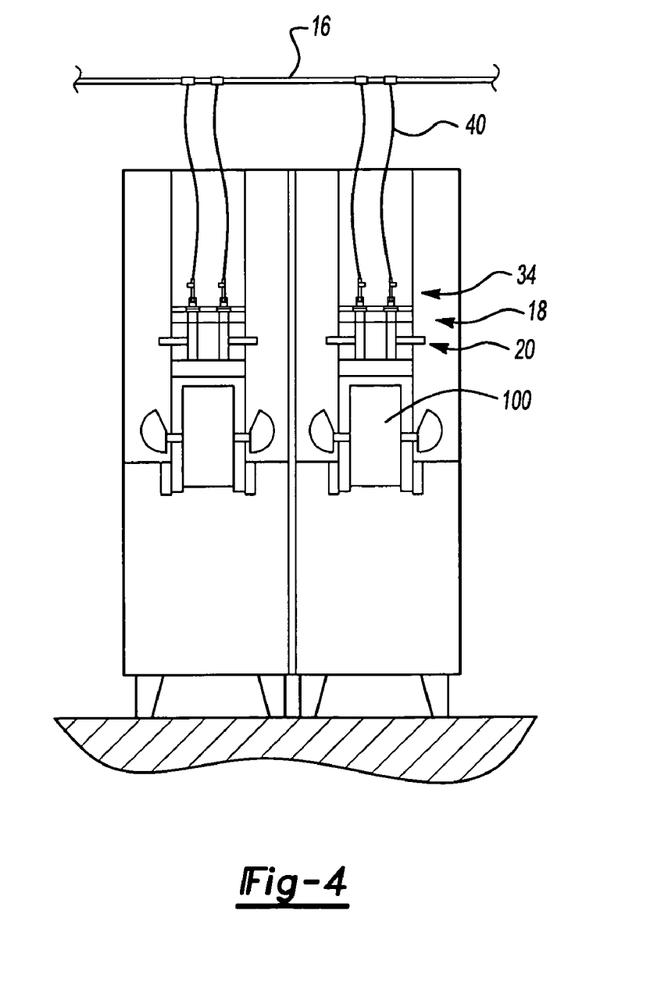
FIG. 4 is section view taken along section lines 4-4 in FIG. 3.

Referring now to FIGS. 2-4, a food processing unit 38 is generally shown. The food processing unit 38 is connected to the manifold 16 of the ink supply system 10 through the quick release couplings and corresponding flexible hoses, such as hose 40. The food processing unit 38 includes one or more extruders 42, 42a and a forming devices 44, 44a. The nozzle assembly 20 is supported in position by the food processing unit 38, between an outlet port 46 of the extruder 42 and the forming device 44. The extruders 42, 42a can include any number of extruder ports. The extruder port 46 is spaced a predetermined distance from the nozzle assembly 20. There may be one or more extruder ports associated with the nozzle assemblies 20. It should be appreciated that the extruders 42, 42a can be of any suitable type known to those skilled in the art, such as a standard extruder or a co-extruder as well as a hot or cold extruder. The forming device 44 is spaced from the nozzle assembly 20 and includes a conveyor for supporting the extruded food product 26. The forming device 44 can include any suitable number of components, such as flatteners, crimpers, and cutters as is known in the art.

A guide 48 is disposed between the extruder outlet port 46 and the nozzle assembly 20 for guiding the food product 26 exiting the extruder 42 into the nozzle assembly 20. The spacing between the extruder port 46 and the nozzle assembly 20 allows the food product 26 to stabilize and for the guide 48 to accurately position the extruded food product 26 relative to the nozzle assembly 20. The spacing also allows the use of a radial arrangement of extruder ports in addition to a parallel arrangement of extruder ports shown best in FIG. 3.

The food product 26 is previously mixed and fed into the extruders 35 as is known in the art. The food product 26 is preferably a grain product, but can be a fruit product, vegetable product, or any other suitable food product that is capable of passing through an extruder. The extruder port 46 discharges the food product 26 at a relatively high velocity to form a continuous rope. The food product 26 can be of any suitable cross-section and of the type that expands upon discharge from the extruder port 46, but can also be of the type that does not expand. In the preferred embodiment, the guide 48 will accurately guide the rope of extruded food product 26 into the nozzle assembly 20 of the exemplary embodiment of the invention. As set forth above, the nature of the food product and the arrangement configured to move the food product to the inventive nozzle assembly can be varied as desired.

Referring now to FIGS. 5-15, the nozzle assembly 20 of the exemplary embodiment of the invention includes a first plate 50, or distribution plate 50, a second plate 52, or die plate 52, and a third plate 54, or end plate 54, stacked with respect to one another. (In FIGS. 12-15, the relative position of the extruder port 46 to the nozzle assembly 20 is exaggerated for illustrative purposes. As discussed above, the extruder port 46 is spaced from the nozzle assembly 20 by a larger predetermined distance.) The distribution plate 50 includes a first front surface 56, a first rear surface 58, and a plurality of apertures 60-60i. The cavity 30 is recessed from the front surface 56. The apertures 60-60i receive bolts that connect the plates 50, 52, 54 together. The distribution plate also includes apertures 62, 62a that extend between the rear surface 58 to the cavity 30. Edible ink is communicated through the apertures 62, 62a to the cavity 30. As best shown schematically in FIG. 1, a fluid line 62 extends between the solenoid valve 34 and the apertures 62, 62a. As best shown in FIG. 11, the fluid line 62 includes branches 64, 66 which engage apertures 62, 62a, respectively.

The distribution plate 50 also includes a first channel 68. The first channel 68 is open to the axis 24, best shown in FIGS. 11 and 14. The food product 26 moves along the axis 24, through the first channel 68 to be sprayed by the first and second sprayers 22, 28. The distribution plate 50 can also include other channels 68a, 68b, 68c which are structured similarly and share similar function as the channel 68.

Figure 7:
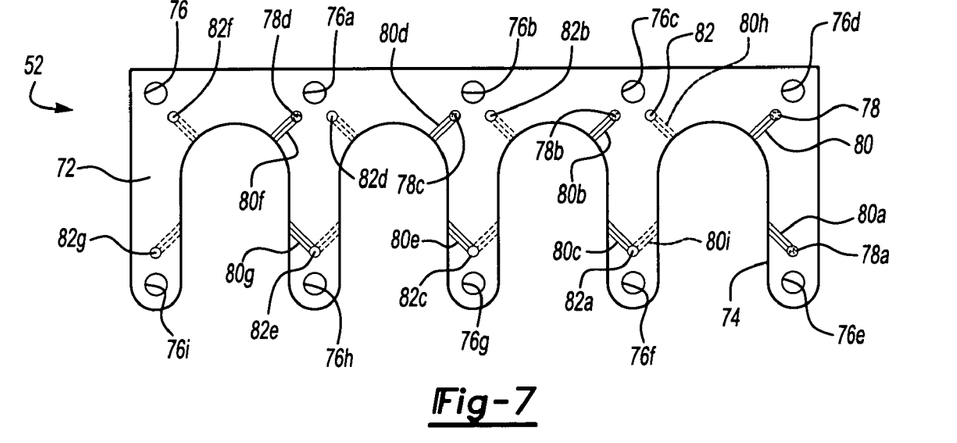
FIG. 7 is a rear view of a second plate, or die plate, according to the exemplary embodiment of the invention.
Figure 9:
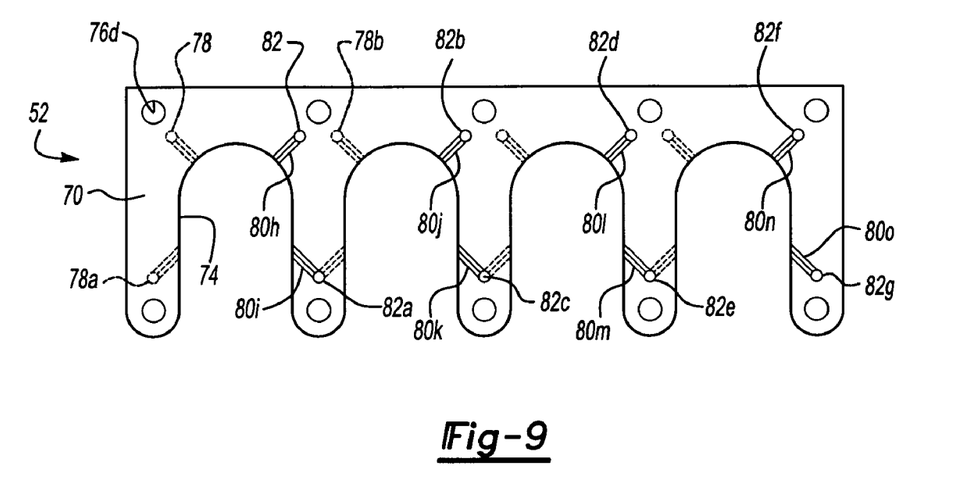
FIG. 9 is a front view of the die plate shown in FIG. 7.

The die plate 52 includes a second front surface 70, a second rear surface 72, and a second channel 74. The die plate 52 also includes apertures 76-76i to receive bolts that connect the plates 50, 52, 54 together. The second rear surface 72 contacts the surface 56 of the distribution plate 50 to substantially seal the cavity 30. The channel 74 aligns with the channel 68.

The die plate 52 also includes a blind aperture 78 communicating with the cavity 30. The die plate 52 includes other blind apertures 78a -78d also communicating with cavity 30. The blind apertures 78-78d extend from the rear surface 72 toward the front surface 70.

Figure 8:
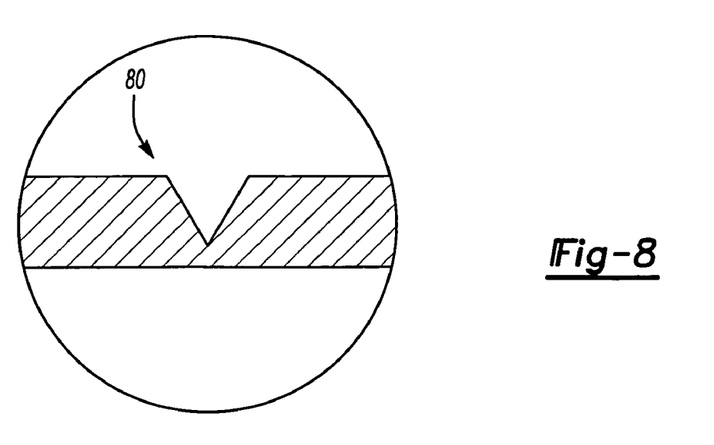
FIG. 8 is a detail view showing the cross-section of a groove formed on the dies plate.

The die plate 52 also includes a plurality of grooves 80-80g recessed from the rear surface 72 and a plurality of grooves 80h-80o recessed from the front surface 70. FIG. 8 is a detail view of the groove 80; all of the grooves 80-80o are similarly structured. The grooves 80, 80a, 80b, 80d, 80f communicate with the blind apertures 78, 78a, 78b, 78c, 78d, respectively. When the solenoid valve 34 is in the open configuration, edible ink moves from the cavity 30, through the blind apertures 78-78d, and through the grooves 80, 80a, 80b, 80d, 80f to coat a food product. Cooperation between the groove 80 and the front surface 56 defines the first sprayer 22. When the solenoid valve 34 is in the open configuration, edible ink moves from the cavity 30, through the blind aperture 78, and through the groove 80 to coat the food product 26.

Figure 10:
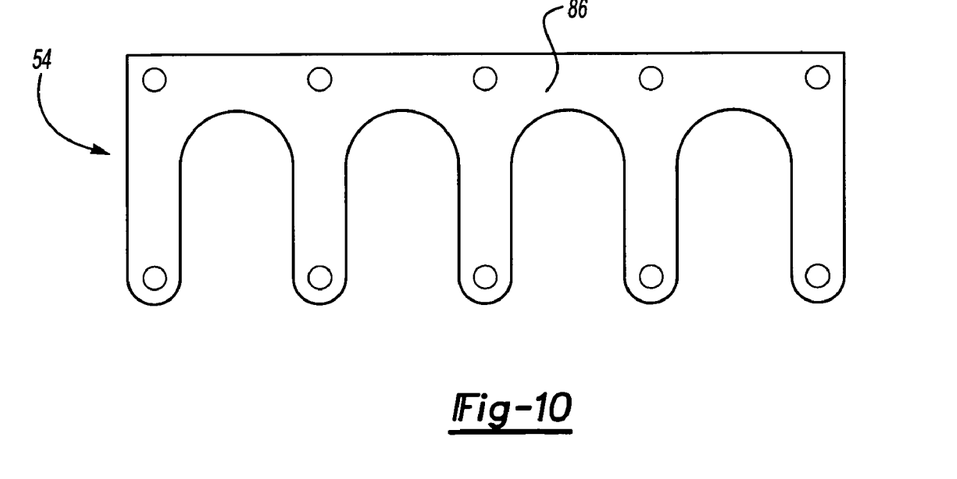
FIG. 10 is a rear view of a third plate, or end plate, according to the exemplary embodiment of the invention.

The die plate 52 also includes apertures 82-82g extending between the front and rear surfaces 70, 72. The groove 80h communicates with the aperture 82. When the solenoid valve 34 is in the open configuration, edible moves through the cavity 30, through the aperture 82, and through groove 80h to coat the food product 26. The end plate 54 includes a third front surface 84 and a third rear surface 86. Cooperation between the groove 80h and the rear surface 86 defines the second sprayer 28.

The groove 80a communicates with the blind aperture 78a and cooperates with the front surface 56 to define a third sprayer 88 (shown in FIG. 11). The groove 80i communicates with the aperture 82a and cooperates with the front surface 56 to define a fourth sprayer 90 (shown in FIG. 11). When the solenoid valve 34 is in the open configuration, edible ink is concurrently sprayed on the food product 26 through the sprayers 22, 28, 88, 90.

The arrangement of the channel 74 and sprayers 22, 28, 88, 90 is repeated in the adjacent channels of the nozzle assembly 20 of the exemplary embodiment of the invention. For example, relative to the rear surface 72 of the die plate 52, the groove 80b communicates with the blind aperture 78b and cooperates with the surface 56 to define a sprayer. The groove 80c communicates with the aperture 82a and cooperates with the surface 56 to define a sprayer. The groove 80*d* communicates with the blind aperture 78*c* and cooperates with the surface 56 to define a sprayer. The groove 80*f* communicates with the blind aperture 78*d* and cooperates with the surface 56 to define a sprayer. The groove 80*e* communicates with the aperture 82*c* and cooperates with the surface 56 to define a sprayer. The groove 80*g* communicates with the aperture 82*e* and cooperates with the surface 56 to define a sprayer.

With respect to the front surface 70 of the die plate 52, the groove 80*k* communicates with the aperture 82*c* and cooperates with the surface 86 to define a sprayer. The groove 80*j* communicates with the aperture 82*b* and cooperates with the surface 86 to define a sprayer. The groove 80*m* communicates with the aperture 82*e* and cooperates with the surface 86 to define a sprayer. The groove 80*l* communicates with the aperture 82*d* and cooperates with the surface 86 to define a sprayer. The groove 80*n* communicates with the aperture 82*f* and cooperates with the surface 86 to define a sprayer. The groove 80*o* communicates with the aperture 82*g* and cooperates with the surface 86 to define a sprayer.

The edible ink is preferably of a different color than the food product 26. The edible ink can be sprayed through the nozzle assembly 20 onto the ropes in a continuous or an interrupted manner and in a variety of patterns including lines, shapes, letters, etc. The edible ink is then dried onto the food product 26. The ropes are generally flattened, but can be crimped or shaped into different forms, in the forming device 62. A predetermined distance should be maintained between the nozzle assembly 20 and the forming device 44 to allow the applied edible ink on the rope of the extruded food product 26 to properly dry before the food product 26 is crimped or flattened. Also, the nozzle assembly 20 should be adjustable relative to the ropes of extruded food product 26 in order to maintain a proper distance between the nozzle assembly 20 and the ropes. The continuous ropes are finally cut into bite-size pieces, cooled, and packaged as is known in the art. Alternatively, the continuous ropes could be cut into snack bar lengths as is known in the art.

Figure 16:
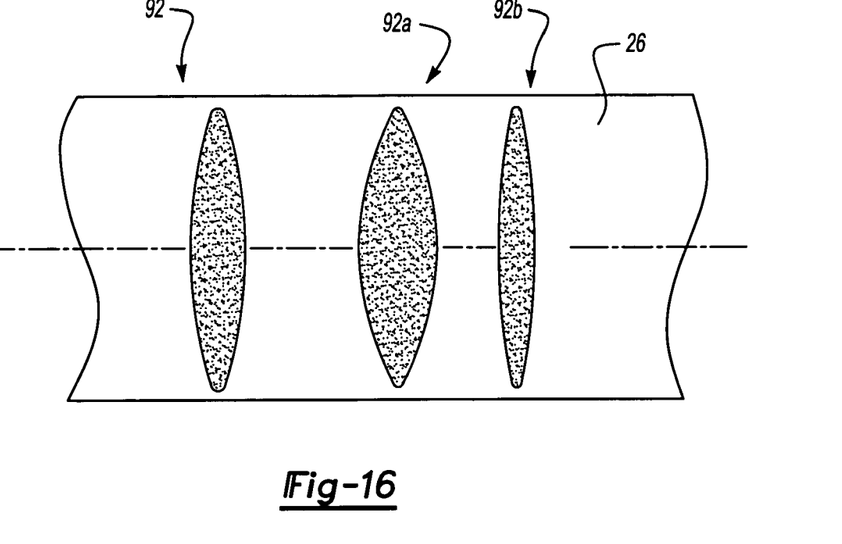
FIG. 16 is side view of a portion of food product sprayed with edible ink by the exemplary embodiment of the invention.
Figure 17:
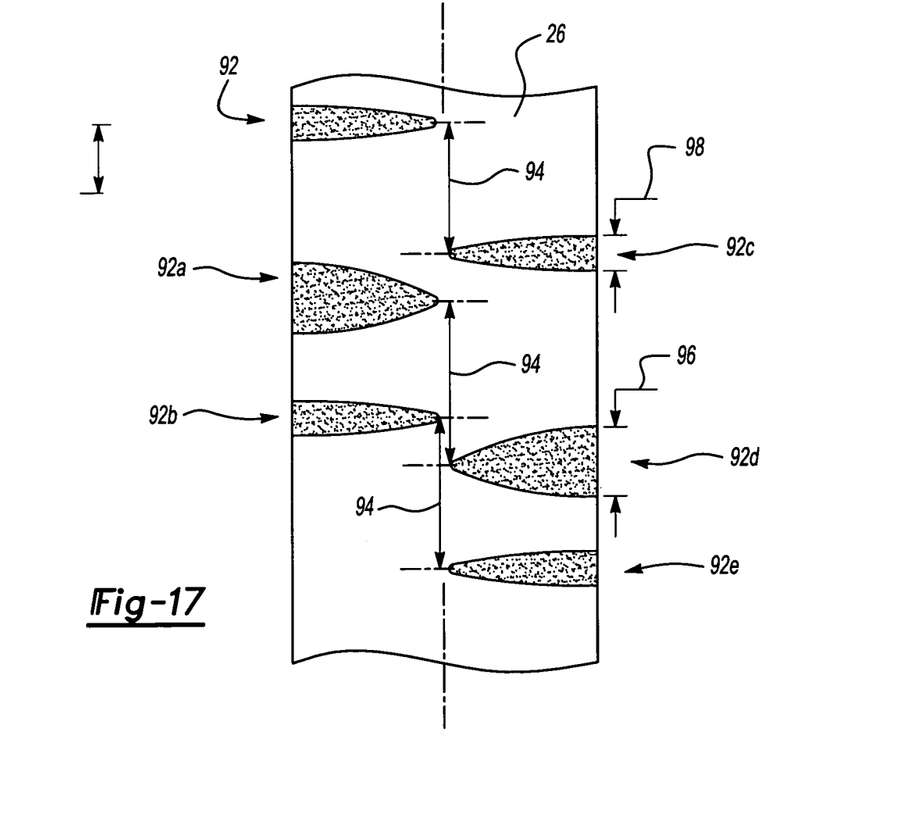
FIG. 17 is a top view of the portion shown in FIG. 16.

One contemplated food product 26 is an orange-colored, directly expanded cereal piece that may or may not have a filling. The contemplated edible ink is an ammonia caramel solution in water that is applied at ambient temperature. Alternatively, the edible ink could be applied at an elevated temperature. The final food product 26 has the appearance of an orange cereal piece with tiger stripes disposed thereon, as best shown in FIGS. 16-17. Stripes 92, 92*a*, 92*b* were produced from edible ink sprayed by the first and third sprayers 22, 88 and the stripes 92*c*, 92*d*, 92*e* were produced from edible ink sprayed by the second and fourth sprayers 28, 90. Stripes 92 and 92*c* were sprayed concurrently, stripes 92*a* and 92*d* were sprayed concurrently, and stripes 92*b* and 92*e* were sprayed concurrently. The distance 94 between stripes on opposite sides of the food product 26 corresponds to the thickness of the die plate 52.

The stripes 92-92*e* are thicker in the middle and taper at the ends because, in the exemplary embodiment of the invention, axially adjacent sprayers such as the first and third sprayers 22, 88 and the second and fourth sprayers 28, 90, are directed to the same position along the axis. It is noted that the first and third sprayers 22, 88 are directed to a first position along the axis 24, the second and fourth sprayers 28, 90 are directed to a second position along the axis 24, and the first and second positions are spaced from one another along the axis 24.

The solenoid valve 34 can be controlled by the controller 36 to vary the distance between stripes. For example, the distance between stripes 92*a*, 92*c* and the stripes 92*a*, 92*d* is greater than the distance between the stripes 92*a*, 92*d* and the stripes 92*b*, 92*e*. The solenoid valve 34 can be opened and closed in to produce an apparently random pattern of stripes on the food product 26. The opening and closing of the solenoid valve 34 can correspond to the rate at which the food product 26 moves along the axis 24 or be controlled independent of the rate at which the food product 26 moves along the axis 24.

Also, the solenoid valve 34 can be controlled by the controller 36 to vary the thickness of pairs of stripes. For example, the thickness 96 of a pair of strips 92*a*, 92*d* is greater than the thickness 98 of the pair of stripes 92, 92*c*. Thickness can be varied by increasing the time that the solenoid valve 34 is in the open configuration.

As an additional feature, optical sensors (not shown) can be incorporated near the extruder ports 46 and/or the nozzle assembly 20 to monitor the exiting of the food product 26 to ensure that the ropes are continuously exiting the corresponding extruder ports 46. In the event that a rope is not present, the nozzle assembly 20 for that rope should be inhibited from spraying. Preferably, reflective optical sensors will be provided for each rope of food product 26.

As a further enhancement, the controller 36, shown in FIG. 1, can be connected to the quick release couplings, can monitor and vary the speed of the extruder(s), and/or the forming device 44.

The opening and closing of the solenoid valve 34 is preferably as short as possible to ensure sharp definition in the printing or inking process. It is contemplated that the spraying of the edible ink through the nozzle assembly 20 will be accomplished in rapid intermittent cycles to create the appearance of stripes on the cereal piece. It is further contemplated that the opening and closing times of the valve 34 should be adjustable and random to produce interesting random patterns of stripes on the food product 26, for example. The patterns and stripes may also be repeated. The valve 34 can be timed or synchronized with the frequency of motion associated with the forming device 44, such as crimping, so that the spraying and crimping is accomplished in a synchronized manner.

Referring again to FIGS. 2-4, a support 100 accurately and securely locates the nozzle assembly 20 relative to the extruder ports 46 and ropes of extruded food product 26. Further, this support 100 may allow users to lift the nozzle assembly 20 away from the ropes of the extruded food product 26 when starting or stopping the extrusion process.

As mentioned above, there may be any number of nozzle assemblies similar to nozzle assembly 20 would preferably form any number of channels to accommodate any number of extruder ports. As also mentioned above, the nozzle assembly 20 could be manufactured and assembled separately such that if a repair is necessary for one nozzle assembly other nozzle assemblies would not be affected. In other words, a user could remove a single malfunctioning nozzle assembly without disturbing the adjacent nozzle assemblies.

The invention has been described in the illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than specifically described.

What is claimed is:

1. A nozzle assembly for spraying a food product comprising:
 a first sprayer disposed along an axis defining, at least in part, a path of movement for a food product;
 a second sprayer disposed along said axis axially and radially spaced from said first sprayer;
 a cavity operable to receive edible ink and communicating directly with said first and second sprayers disposed along said axis such that said first and second sprayers concurrently spray the edible ink from said cavity to said axis;
 a first plate having a first channel open to said axis and a first front surface and a first rear surface wherein said cavity is further defined as being recessed from said first front surface; and
 a second plate having a second channel aligned with said first channel and a second front surface and second rear surface opposing said first front surface, said second plate also having a first blind aperture extending from said second rear surface toward said second front surface and communicating with said cavity, said second plate also having a first groove extending along said second rear surface between said first blind aperture and said first and second channels, wherein said cooperation between said first groove and said first front surface defines said first sprayer.

2. The nozzle assembly of claim 1 further comprising:
 a third plate having a third channel aligned with said first and second channels and a third front surface and third rear surface opposing said second front surface, wherein said second plate includes a first aperture communicating with said cavity and extending between said second front and second rear surfaces and said second plate also includes a second groove extending along said second front surface between said first aperture and said second and third channels, wherein said cooperation between said second groove and said third rear surface defines said second sprayer.

3. The nozzle assembly of claim 2 wherein said second plate further comprises:
 a second blind aperture extending from said second rear surface toward said second front surface and communicating with said cavity; and
 a third groove extending along said second rear surface between said second blind aperture and said first and second channels, wherein said cooperation between said third groove and said first front surface defines a third sprayer.

4. The nozzle assembly of claim 3 wherein said wherein said second plate further comprises:
 a second aperture communicating with said cavity and extending between said second front and second rear surfaces; and
 a fourth groove extending along said second front surface between said second aperture and said second and third channels, wherein said cooperation between said fourth groove and said third rear surface defines a fourth sprayer.

5. The nozzle assembly of claim 4 wherein said third sprayer is further defined as being disposed along said axis and axially aligned with and radially spaced from said first sprayer and said fourth sprayer is further defined as being disposed along said axis and axially aligned with and radially spaced from said second sprayer, wherein said cavity is further defined as communicating directly with said third and fourth sprayers disposed along said axis such that said first and second and third and fourth prayers concurrently spray the edible ink to said axis.

6. The nozzle assembly of claim 5 wherein said first plate includes a fourth channel adjacent to said first channel and said second plate includes a fifth channel adjacent to said second channel and said third plate includes a sixth channel adjacent to said third channel, wherein said fourth and fifth and sixth channels are aligned and open to a second axis defining, at least in part, a path of movement for a second food product.

7. The nozzle assembly of claim 6 wherein said second plate further comprises:
 a third blind aperture extending from said second rear surface toward said second front surface and communicating with said cavity;
 a fifth groove extending along said second rear surface between said second blind aperture and said fourth and fifth channels, wherein said cooperation between said third groove and said first front surface defines a fifth sprayer; and
 a sixth groove extending along said second rear surface between said second aperture and said fourth and fifth channels, wherein said cooperation between said sixth groove and said first front surface defines a sixth sprayer.

* * * * *